(12) United States Patent
Alexovski et al.

(10) Patent No.: US 12,606,179 B2
(45) Date of Patent: Apr. 21, 2026

(54) CALIBRATION OF A VEHICLE SENSOR

(71) Applicant: ZF Friedrichshafen AG,
Friedrichshafen (DE)

(72) Inventors: Marko Alexovski, Markdorf (DE);
Aless Lasaruk, Meckenbeuren (DE)

(73) Assignee: ZF Friedrichshafen AG,
Friedrichshafen (DE)

( * ) Notice: Subject to any disclaimer, the term of this
patent is extended or adjusted under 35
U.S.C. 154(b) by 248 days.

(21) Appl. No.: 18/472,425

(22) Filed: Sep. 22, 2023

(65) Prior Publication Data

US 2024/0101126 A1 Mar. 28, 2024

(30) Foreign Application Priority Data

Sep. 23, 2022 (DE) ..................... 10 2022 210 038.7

(51) Int. Cl.
*B60W 40/10* (2012.01)
(52) U.S. Cl.
CPC ......... *B60W 40/10* (2013.01); *B60W 2510/20*
(2013.01)
(58) Field of Classification Search
CPC . B60W 40/10; B60W 2510/20; G01S 17/931;
G01S 7/4972
See application file for complete search history.

(56) References Cited

U.S. PATENT DOCUMENTS

| | | | |
|---|---|---|---|
| 9,279,670 B2 | 3/2016 | Schommer et al. | |
| 10,176,596 B1 * | 1/2019 | Mou ..................... | G01S 17/931 |

| | | | | |
|---|---|---|---|---|
| 10,698,082 B2 * | 6/2020 | McCloskey | ............. | G01S 17/08 |
| 10,723,281 B1 * | 7/2020 | Briggs | ..................... | G01S 7/497 |
| 2018/0045536 A1 * | 2/2018 | Kümmerle | ........... | G05D 1/0272 |
| 2018/0372841 A1 * | 12/2018 | Hieida | ..................... | G01S 13/89 |
| 2020/0105018 A1 * | 4/2020 | Corghi | ................. | G05D 1/0246 |
| 2020/0300967 A1 * | 9/2020 | Demerly | .............. | G01S 17/931 |
| 2024/0412413 A1 * | 12/2024 | Erdei | ........................ | G06T 7/80 |

FOREIGN PATENT DOCUMENTS

| | | | | | |
|---|---|---|---|---|---|
| CN | 109490856 A | * | 3/2019 | ........... | H04L 12/403 |
| DE | 102010062696 A1 | | 6/2012 | | |
| DE | 102017203037 A1 | * | 8/2018 | .............. | G06T 7/97 |
| DE | 102018106464 A1 | | 9/2019 | | |
| DE | 102018112597 A1 | * | 11/2019 | .......... | G01S 15/102 |
| DE | 102019220049 A1 | | 6/2021 | | |
| DE | 102021201923 A1 | * | 9/2022 | .............. | G06T 7/80 |
| EP | 3593338 B1 | * | 4/2021 | ............. | G08G 1/161 |

OTHER PUBLICATIONS

German Search Report DE 10 2022 210 038.7, dated Jun. 27, 2023.
(14 pages).

* cited by examiner

*Primary Examiner* — Mary Cheung
(74) *Attorney, Agent, or Firm* — Dority & Manning, P.A.

(57) ABSTRACT

A method (200) for calibrating a vehicle sensor (105)
mounted on a vehicle (110) includes: scanning a marker
(120) in the area of the vehicle sensor (105) by a sensor
device (115); determining a first pose of the marker (120) in
relation to the sensor device (115); scanning a structural
feature (140) of the vehicle (110) by the sensor device (115);
determining a second pose of the vehicle (110) in relation to
the sensor device (115); and determining a third pose of the
marker (120) in relation to the vehicle (110) on the basis of
the first pose and the second pose.

15 Claims, 2 Drawing Sheets

CALIBRATION OF A VEHICLE SENSOR

CROSS-REFERENCE TO RELATED APPLICATION

The present application is related and has right of priority to German Patent Application No. DE102022210038.7 filed on Sep. 23, 2022, which is incorporated by reference in its entirety for all purposes.

FIELD OF THE INVENTION

The present invention relates generally to the calibration of a vehicle sensor. In particular, the invention relates generally to the individual calibration of a sensor mounted on the vehicle in order to correctly detect an object in the surroundings of the vehicle.

BACKGROUND

A motor vehicle includes a vehicle sensor, which is designed to scan the surroundings of the motor vehicle. In particular, an object in the surroundings can be detected by the vehicle sensor. A pose of the object in relation to the motor vehicle can be determined on the basis of sensor values. The pose includes a position and an orientation of the object in relation to the motor vehicle. Naturally, however, only one pose of the object in relation to the sensor can be determined by the sensor. The vehicle sensor must be calibrated, since a precise orientation or position of the sensor in relation to the motor vehicle is usually not sufficiently accurate. To this end, the position and the orientation of the vehicle sensor in relation to the motor vehicle are usually accurately determined, such that the pose of the object determined with respect to the sensor can be converted into a pose in relation to the motor vehicle.

The motor vehicle can be controlled by an open-loop system on the basis of the determined position, orientation or pose of the object in relation to the motor vehicle. For example, a driving assistant or an autonomous control can be provided for the motor vehicle, for example, to avoid a collision of the motor vehicle with the object. If the sensor is inaccurately calibrated, a position or orientation of the object in relation to the motor vehicle can be inaccurate or erroneous, such that the collision avoidance can fail.

To calibrate a vehicle sensor, according to a known method, a pose of the motor vehicle in relation to a known marker in the area of the vehicle sensor is determined or set in a first step. The marker is located in the surroundings of the motor vehicle. In a second step, a pose of the marker with respect to the vehicle sensor can be determined or estimated. A calibration can then be carried out on the basis of the two determined poses.

This approach can be complex, however, in particular when sensors belonging to multiple different vehicles are to be calibrated in one measurement setup. In addition, the first step can be difficult to carry out, because the vehicle frequently does not have any good orientation points, on the basis of which the pose of the motor vehicle can be determined. Known systems therefore usually use a guide rail on the vehicle or a roller for a wheel of the vehicle in order to assist the first step. Overall, this can make the calibration complex or susceptible to error.

SUMMARY OF THE INVENTION

Example aspects of the present invention provide an improved technique for calibrating a vehicle sensor in relation to the surroundings of the vehicle.

According to a first example aspect of the present invention, a method for calibrating a vehicle sensor mounted on a vehicle includes: scanning a marker in the area of the vehicle sensor by a sensor device; determining a first pose of the marker in relation to the sensor device; scanning a structural feature of the vehicle by the sensor device; determining a second pose of the vehicle in relation to the sensor device; and determining a third pose of the marker in relation to the vehicle on the basis of the first pose and the second pose.

According to the method, the first pose and the second pose can be determined such that the first and second poses can be combined in an improved way to form the third pose. In particular, a deviation between coordinate systems of the sensor device and the marker can be determined by the first pose and a deviation between coordinate systems of the vehicle in relation to the sensor device can be determined by the second pose. The individual poses can be checked for consistency and plausibility in an improved way. Error propagation can be avoided in an improved way.

It can be unnecessary to mechanically move or orient the vehicle in relation to the marker. A second pose can be determined for each of a plurality of vehicles on the basis of the first pose, such that vehicle sensors on the vehicles can be individually calibrated. Measurement complexity or processing complexity can be reduced in relation to known techniques.

It is preferred when the sensor device and the marker are immovable in relation to each other. The sensor device and the marker can be attached to each other or both can be fixedly mounted and oriented in relation to an invariable system, for example, a floor surface. In this way, it can be ensured that the determined first pose is also still correct when a certain amount of time has lapsed since the determination.

It is particularly preferred when the vehicle is moved in relation to the sensor device between the scan of the marker and the scan of the structural feature. In this way, it can be ensured that a line of sight between the sensor device and the marker is free during the first scan. In addition, it can be ensured that the vehicle is located in an advantageous pose in relation to the sensor device during the second scan. The first scan and the second scan can also be carried out at the same time under certain circumstances, in particular when the vehicle has a short length and/or a high ground clearance.

The sensor device can be located under the vehicle while the structural feature of the vehicle is scanned. It has been recognized that both the first pose of the marker and the second pose of the vehicle in relation to the sensor device can be readily determined from this position.

The structural feature and the marker can be scanned separately from each other. Sensor data gathered in both scans can be combined to form one common data set. By combining the data, it can be ensured in an improved way that the scans are situated in a reference system of the sensor device such that the scans are consistent with each other. In particular, the orientation can be carried out with reference to a section of the vehicle that was detected in the first scan. This section can be appropriately oriented with respect to another section, which was detected in the second scan.

It is further preferred when the marker and/or the structural feature are/is identified in sensor data gathered in a scan. For example, the identification can be carried out on the basis of the common data set. The sensor device is preferably designed to provide a plurality of sensor values, each of which has spatial coordinates of a detected object.

For example, the sensor device can include a radar sensor or, further preferably, a LiDAR sensor. The sensor device can provide a cloud of points or a plurality of points that is located in the surroundings of the sensor device. Points that can be assigned to the marker or to the structural feature can be identified in such a cloud of points. A position and/or orientation of the marker or of the structural feature in relation to the sensor device can be reliably and precisely determined on this basis.

According to a further preferred example embodiment, the vehicle has an axle that includes an unsteered wheel and the structural feature includes the wheel or a portion thereof. Alternatively, another structural feature, which is preferably fixedly connected to the axle, can also be detected. The vehicle can include, in particular, a motor vehicle having at least two unsteered wheels. In particular when these wheels are provided on a rear axle, the wheels must be precisely oriented in order to enable a directional stability of the vehicle. This precise orientation can be used by orienting the vehicle on the basis of the orientation of an unsteered wheel.

It is further preferred when a vehicle sensor mounted on the vehicle is calibrated on the basis of the third pose in relation to the vehicle. The calibration is preferably carried out such that a deviation between the third pose of the marker in relation to the vehicle and a fourth pose determined in a scan of the marker by the vehicle sensor in relation to a reference system of the sensor is minimized. Due to the calibration, the vehicle sensor can be used in an improved way to correctly determine the pose of an object in the surroundings of the vehicle.

According to a further example aspect of the present invention, a device for calibrating a vehicle sensor mounted on a vehicle includes a sensor device, which is designed to scan a marker in the area of the vehicle sensor and a structural feature of the vehicle; and a processing device. The processing device is designed to determine a first pose of the marker in relation to the sensor device and a second pose of the vehicle in relation to the sensor device. Furthermore, a third pose of the marker in relation to the vehicle can be determined by the processing device on the basis of the first pose and the second pose.

The processing device can be designed to entirely or partially carry out a method described herein. To this end, the processing device can be electronic and include a programmable microcomputer or microcontroller and the method can be present in the form of a computer program product including program code. The computer program product can also be stored on a computer-readable data carrier. Features or advantages of the method can be transferred to the device, and vice versa.

BRIEF DESCRIPTION OF THE DRAWINGS

Example aspects of the invention will now be described in greater detail with reference to the attached figures, in which.

DETAILED DESCRIPTION

Figure 1:
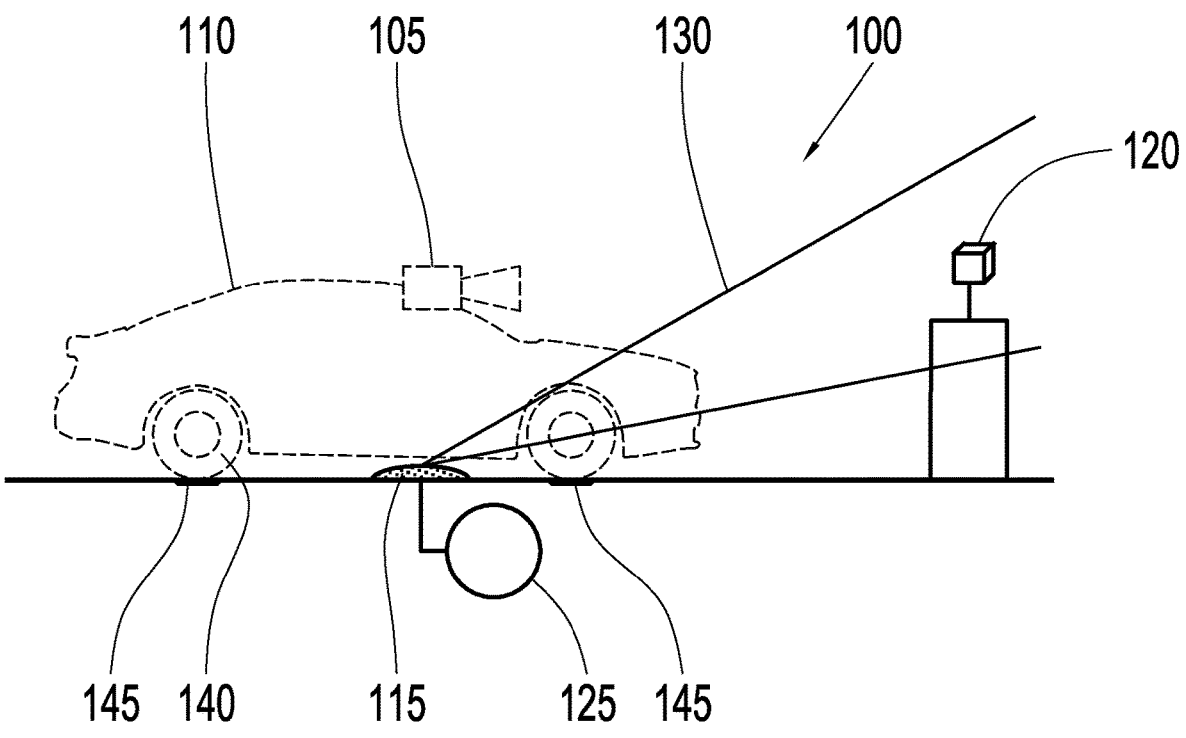
FIG. 1 shows a device for calibrating a vehicle sensor.
Figure 1:
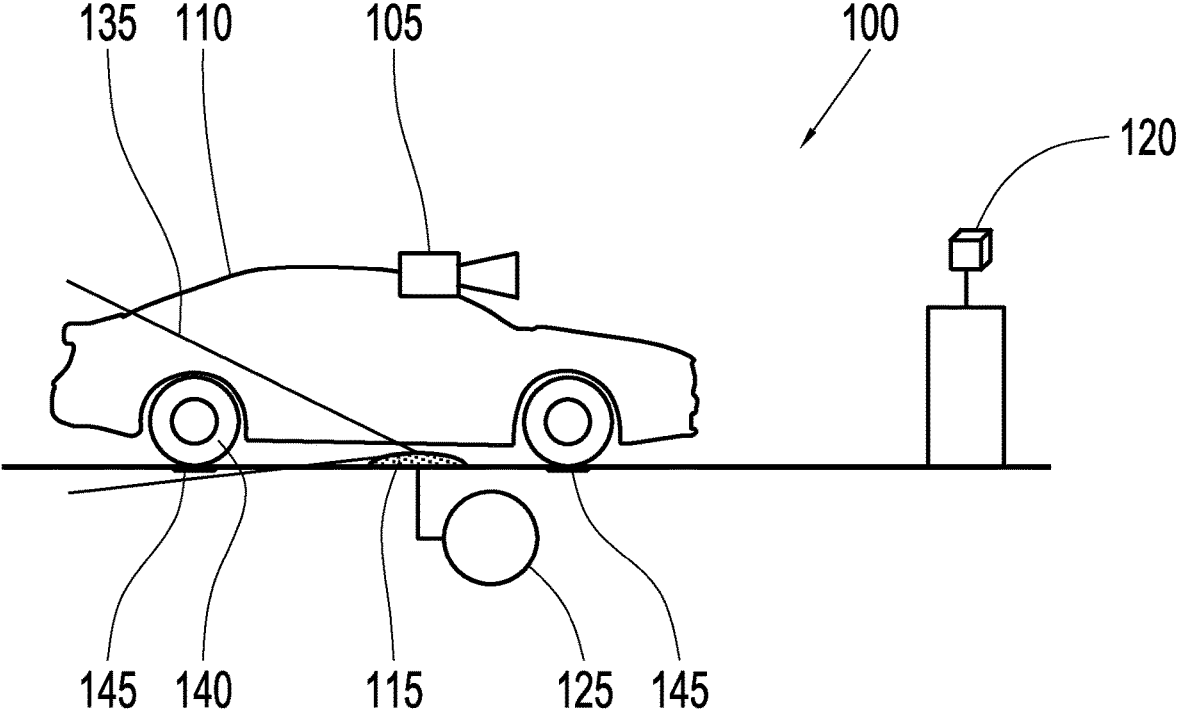

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a device 100 for calibrating a vehicle sensor 105, which is mounted on a vehicle 110. The vehicle 110 is shown as a passenger car, by way of example. In other embodiments, the vehicle 110 can also be realized in ways other than that which is shown and, in particular, include a transporter or a bus, which can be designed, in particular, for autonomous driving.

In an upper area of FIG. 1, the device 100 is shown in an operation without the vehicle 110 and, in a lower area, in an operation with the vehicle 110. The device 100 includes a sensor device 115, a marker 120 and a processing device 125. The sensor device 115 is designed to provide three-dimensional position determinations of points in the surroundings of the sensor device 115. To this end, the sensor device 115 preferably has one or multiple LiDAR sensor(s). Alternatively, for example, a depth camera or a ToF camera can also be used. The sensor device 115 has a first detection range 130, which includes the marker 120, and a second detection range 135, which includes a predetermined structural feature 140 of the vehicle 110. A crude position of the vehicle 110 in relation to the sensor device 115 can be predetermined, for example, by a holding space 145 in which a wheel of the vehicle 110 should be located during the scanning of the structural feature 140. The structural feature 140 preferably includes a wheel of the vehicle 110, preferably an unsteered wheel, such that the structural feature 140 can match the wheel to be arranged in the holding space 145.

The marker 120 can include any type of test body, which is preferably designed such that the position and orientation of the marker 120 can be readily determined on the basis of points on the surface of the marker 120. By way of example, the marker 120 has an arrangement made up of three flat elements, which are situated perpendicularly to one another in pairs. An arrangement of this type having square elements of equal size is also referred to as a semi-cube. A concave side of the semi-cube preferably faces the vehicle 110 and the sensor device 115 or the vehicle sensor 105.

The device 100 is preferably used such that the marker 120 is scanned while the vehicle 110 is situated at a distance away as indicated in the upper area of FIG. 1. In addition, a second scan is carried out as indicated in the lower area of FIG. 1 while the vehicle 110 is located at or in the device 100. In particular, the structural feature 140 is scanned by the sensor device 115.

The processing device 125 is designed to determine and further process various poses on the basis of the scans. A pose includes a position and an orientation and is based on a reference system, wherein various elements can have various reference systems. For example, the marker 120 can assume a pose in relation to a reference system of the vehicle 110 or in relation to a reference system of the sensor device 115. The following remarks are based on the marker 120 assuming a pose in relation to the vehicle 110 or the sensor device 115 for the sake of simplicity.

The aim of the processing of poses is to provide calibration data that indicate a pose of the vehicle sensor 105 in relation to the vehicle 110 or enable a misalignment of the vehicle sensor 105 to be minimized. The misalignment relates to a difference between the actual pose of an object, such as the marker 120, in relation to the vehicle 110 and a pose that has been determined on the basis of a scan of the object by the vehicle 110. In other words, the calibration is to make it possible to determine the correct pose of the marker 120 in relation to the vehicle 110 by the vehicle sensor 105.

Figure 2:
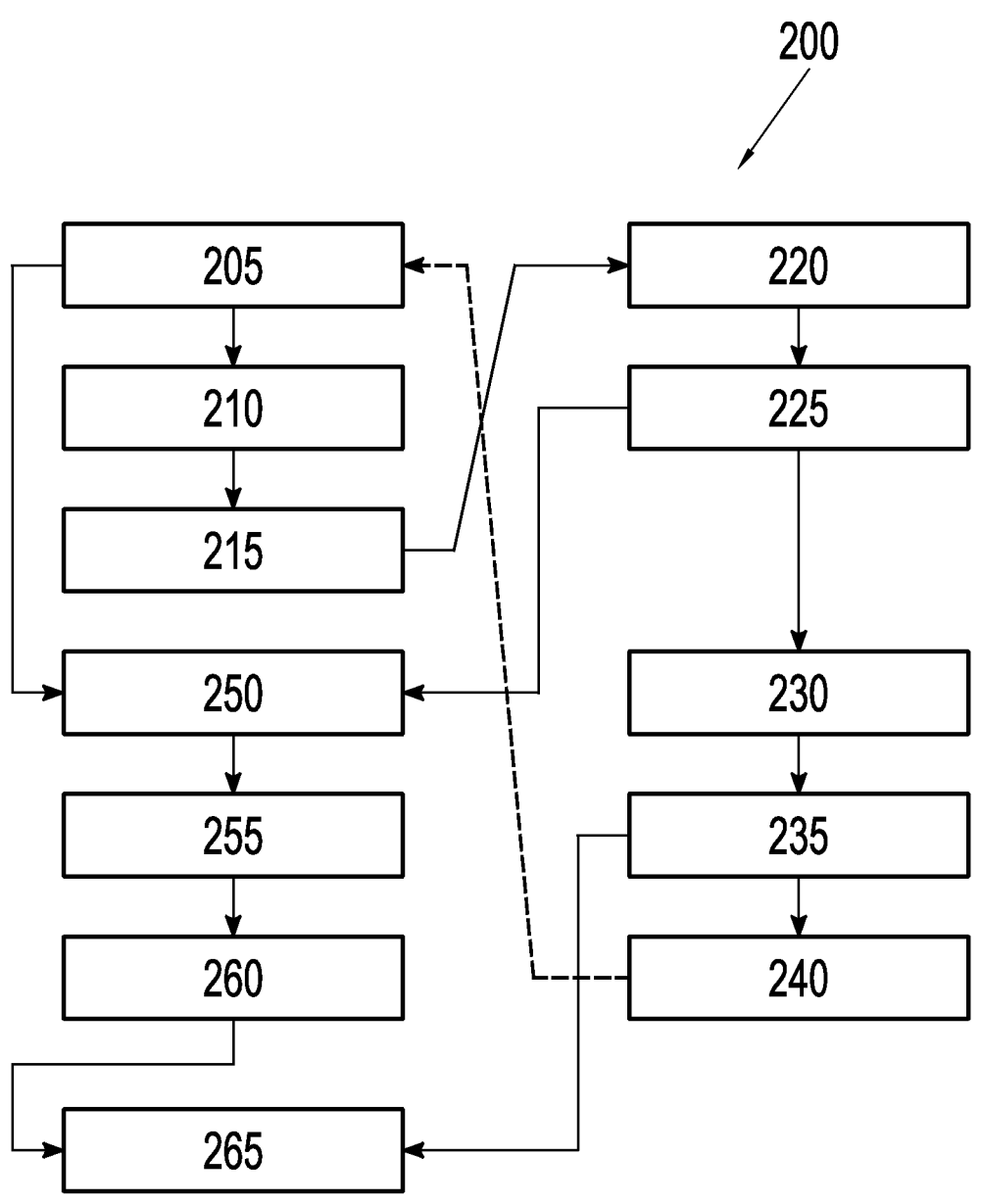
FIG. 2 shows a flow chart of a method.

FIG. 2 shows a flow chart of an exemplary method 200 for calibrating a vehicle sensor 105. The method 200 can be carried out, in particular, by the device 100. Purely by way of example, it is initially assumed that the vehicle 110 is not located at or in the device 100.

In a step 205, the marker 120 can be scanned by the sensor device 115. In a subsequent step 210, a first pose of the marker 120 in relation to the sensor device 115 can be determined. Thereafter, in a step 215, the vehicle 110 can be moved into an approximately predetermined position in relation to the sensor device 115. This position is distinguished by the fact that the predetermined structural feature 140 is located in the second detection range 135. This usually also requires, however, that the marker 120, which is otherwise located in the first detection range 130, is shadowed by a section of the vehicle 110. If this is not the case, the steps 205 and 210 can also be carried out while the vehicle 110 is located at or in the device 100.

In a step 220, the structural feature 140 of the vehicle 110 can be scanned by the sensor device 115. Thereupon, in a step 225, a second pose can be determined, which is present between the structural feature 140 of the vehicle 110 and the sensor device 115.

Optionally, in a step 230, the marker 120 can be scanned by the vehicle sensor 105. In a step 235, a fourth pose can then be determined, which relates to the marker 120 in relation to the vehicle sensor 105.

The method 200 can also be carried out by initially carrying out the steps 220 through 235 and only thereafter carrying out the steps 205 and 210. In this case, the vehicle 110 can be removed from the device 100 in a step 240 before continuing on to the step 205.

In a step 250, sensor values from the scans carried out in the steps 205 and 225 can be combined. In a step 255, an object, in particular the marker 120 or the structural feature 140, can be detected in one or multiple scan(s) carried out by the sensor device 115. Therefore, a third pose can be determined in a step 260, which relates to the marker 120 in relation to the vehicle 110. The third pose can represent a reference value that should be reached by a scanning system aboard the vehicle 110 that uses the vehicle sensor 105 to detect the marker 120. If the vehicle sensor 105 is oriented in an unknown or erroneous way in relation to the vehicle 110, a fault arising as a result can be minimized by an appropriate compensation. The compensation can include changing the position or orientation of the vehicle sensor 105 on the vehicle 110 or taking the determined fault into account.

The calibration can be carried out in a step 265 on the basis of the third pose of the step 260 and the fourth pose of the step 235 with respect to the steps 230, 235, which were previously carried out.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

100 device
105 vehicle sensor
110 vehicle
115 sensor device
120 marker
125 processing device
130 first detection range
135 second detection range
140 structural feature
145 holding space
200 method
205 scan the marker by the sensor device
210 determine the first pose: marker vs. sensor device
215 move the vehicle over the sensor device
220 scan the structural feature of the vehicle by the sensor device
225 determine the second pose: marker vs. sensor device
230 scan the marker by the vehicle sensor
235 determine the fourth pose: marker vs. vehicle sensor
240 remove the vehicle from the device
250 combine the sensor values
255 identify the object
260 determine the third pose: marker vs. vehicle
265 calibrate the vehicle sensor

The invention claimed is:

1. A method (200) for calibrating a vehicle sensor (105) mounted on a vehicle (110), comprising:
   scanning (205) a marker (120) in the area of the vehicle sensor (105) with a sensor device (115), the sensor device (115) being separate of the vehicle (110);
   determining (210), with a processing device (125), a first pose of the marker (120) in relation to the sensor device (115) based at least in part on sensor data generated by the sensor device (115) when scanning the marker (120);
   scanning (220) a structural feature (140) of the vehicle (110) with the sensor device (115), the sensor device (115) being located under the vehicle (110) while scanning the structural feature (140) of the vehicle (110);
   determining (225), with the processing device (125), a second pose of the vehicle (110) in relation to the sensor device (115) based at least in part on sensor data generated by the sensor device (115) when scanning the structural feature (140) of the vehicle (110);
   determining (260), with the processing device (125), a third pose of the marker (120) in relation to the vehicle (110) on the basis of the first pose and the second pose; and
   calibrating the vehicle sensor (105) mounted on the vehicle (110) on the basis of the third pose in relation to the vehicle (110).

2. The method (200) of claim 1, wherein the sensor device (115) and the marker (120) are fixed relative to each other.

3. The method (200) of claim 1, wherein the vehicle (110) moves (215) relative to the sensor device (115) between scanning the marker (120) and scanning the structural feature (140).

4. The method (200) of claim 1, wherein scanning the structural feature (140) and scanning the marker (120) are performed separately, and the sensor data gathered from both scanning the structural feature (140) and scanning the marker (120) are combined (250) to form one common data set.

5. The method (200) of claim 1, wherein the marker (120) and/or the structural feature (140) are identified (255) in the sensor data gathered in a scan.

6. The method (200) of claim 1, wherein the vehicle (110) comprises an axle with an unsteered wheel and the structural feature (14) includes the unsteered wheel.

7. The method (200) of claim 1, wherein calibrating the vehicle sensor (105) mounted on the vehicle (110) on the basis of the third pose in relation to the vehicle (110) comprises calibrating the vehicle sensor (105) on the basis of the third pose in relation to the vehicle (110) in order to minimize a deviation between the third pose of the marker (120) in relation to the vehicle (110) and a fourth pose (235) determined in a scan (230) of the marker (120) by the vehicle sensor (105) in relation to a reference system of the vehicle sensor (105).

8. The method (200) of claim 1, wherein calibrating the vehicle sensor (105) mounted on the vehicle (110) on the basis of the third pose in relation to the vehicle (110) comprises automatically calibrating, with the processing device (125), the vehicle sensor (105) on the basis of the third pose in relation to the vehicle (110).

9. The method (200) of claim 8, wherein automatically calibrating, with the processing device (125), the vehicle sensor (105) on the basis of the third pose in relation to the vehicle (110) comprises automatically changing a position of the vehicle sensor (105) or adjusting a compensation for evaluating data generated by the vehicle sensor (105).

10. The method of claim 1, wherein the vehicle sensor (105) is usable for open-loop autonomous control of the vehicle (110).

11. A device (100) for calibrating a vehicle sensor (105) mounted on a vehicle (110), comprising:
a sensor device (115) configured for scanning a marker (120) in the area of the vehicle sensor (105) and a structural feature (140) of the vehicle (110), the sensor device (115) being separate of the vehicle (110), the sensor device (115) being located under the vehicle (110) while scanning the structural feature (140) of the vehicle (110); and
a processing device (125) configured for:
determining a first pose of the marker (120) in relation to the sensor device (115) and a second pose of the vehicle (110) in relation to the sensor device (115) based at least in part on sensor data generated by the sensor device (115) during scanning of the marker

8

(120) and during scanning of the structural feature (140) of the vehicle (110); and
determining a third pose of the marker (120) in relation to the vehicle (110) on the basis of the first pose and the second pose, the third pose being usable for calibrating the vehicle sensor (105).

12. The device (100) of claim 11, wherein the processing device (125) is further configured for automatically calibrating the vehicle sensor (105) mounted on the vehicle (110) on the basis of the third pose in relation to the vehicle (110).

13. The device (100) of claim 11, wherein the sensor device (115) and the marker (120) are fixed relative to each other.

14. A method (200) for calibrating a vehicle sensor (105) mounted on a vehicle (110), comprising:
scanning (205) a marker (120) in the area of the vehicle sensor (105) with a sensor device (115), the sensor device (115) being separate of the vehicle (110) a line of sight of the sensor device (115) between the sensor device (115) and the marker (120) being free when scanning the marker (120);
determining (210), with a processing device (125), a first pose of the marker (120) in relation to the sensor device (115) based at least in part on sensor data generated by the sensor device (115) when scanning the marker (120);
scanning (220) a structural feature (140) of the vehicle (110) with the sensor device (115), the vehicle (110) being between the sensor device (115) and the marker (120) in the line of sight of the sensor device (115) when scanning the structural feature (140);
determining (225), with the processing device (125), a second pose of the vehicle (110) in relation to the sensor device (115) based at least in part on sensor data generated by the sensor device (115) when scanning the structural feature (140) of the vehicle (110);
determining (260), with the processing device (125), a third pose of the marker (120) in relation to the vehicle (110) on the basis of the first pose and the second pose; and
calibrating the vehicle sensor (105) mounted on the vehicle (110) on the basis of the third pose in relation to the vehicle (110).

15. The method (200) of claim 14, further comprising moving the vehicle (110) relative to the sensor device (115) between scanning the marker (120) and scanning the structural feature (140) such that the vehicle (110) is between the sensor device (115) and the marker (120) in the line of sight of the sensor device (115).

* * * * *